United States Patent [19]

Kruse

[11] Patent Number: 5,709,266
[45] Date of Patent: Jan. 20, 1998

[54] PELLET DISPENSING DEVICE

[76] Inventor: Gary H. Kruse, 1022 Zien Circle Dr., Box 259, Lake View, Iowa 51450

[21] Appl. No.: 606,841

[22] Filed: Feb. 26, 1996

[51] Int. Cl.$^6$ .............................................. E21B 33/068
[52] U.S. Cl. ........................ 166/75.15; 137/268; 221/277
[58] Field of Search ................... 166/75.15, 70; 221/277; 137/268

[56] References Cited

U.S. PATENT DOCUMENTS

| | | | |
|---|---|---|---|
| 3,039,531 | 6/1962 | Scott | 166/75.15 |
| 3,430,729 | 3/1969 | Hickey | 166/75.15 |
| 4,042,114 | 8/1977 | Arlid et al. | 221/277 X |
| 4,615,169 | 10/1986 | Würmli | 221/277 |
| 4,694,900 | 9/1987 | Behrens | 166/75.1 |
| 5,097,985 | 3/1992 | Jones | 221/277 |

FOREIGN PATENT DOCUMENTS

| | | | |
|---|---|---|---|
| 292791 | 6/1916 | Germany | 221/277 |
| 345415 | 12/1921 | Germany | 221/277 |
| 559375 | 9/1932 | Germany | 221/166 |
| 961922 | 10/1982 | Russian Federation | 221/166 |

OTHER PUBLICATIONS

Pell–Chlor II—Dry Pellet Chlorinator by Krudico.
Pell–Chlor II—Installation Manual by Krudico.

*Primary Examiner*—Hoang C. Dang
*Attorney, Agent, or Firm*—Zarley, McKee, Thomte, Voorhees & Sease

[57] ABSTRACT

An improved pellet dispensing device is provided for dispensing chemical pellets into a well. The device includes a housing which defines a pellet chamber, a motor operatively connected to the well pump, and a discharge tube providing communication between the device and the well. The improvement includes a metering drum rotatably mounted within the pellet chamber to pickup and carry a single pellet from the chamber to the discharge tube. The drum includes one or more pickup members extending outwardly from the surface of the drum and being equally radially spaced about the drum.

4 Claims, 2 Drawing Sheets

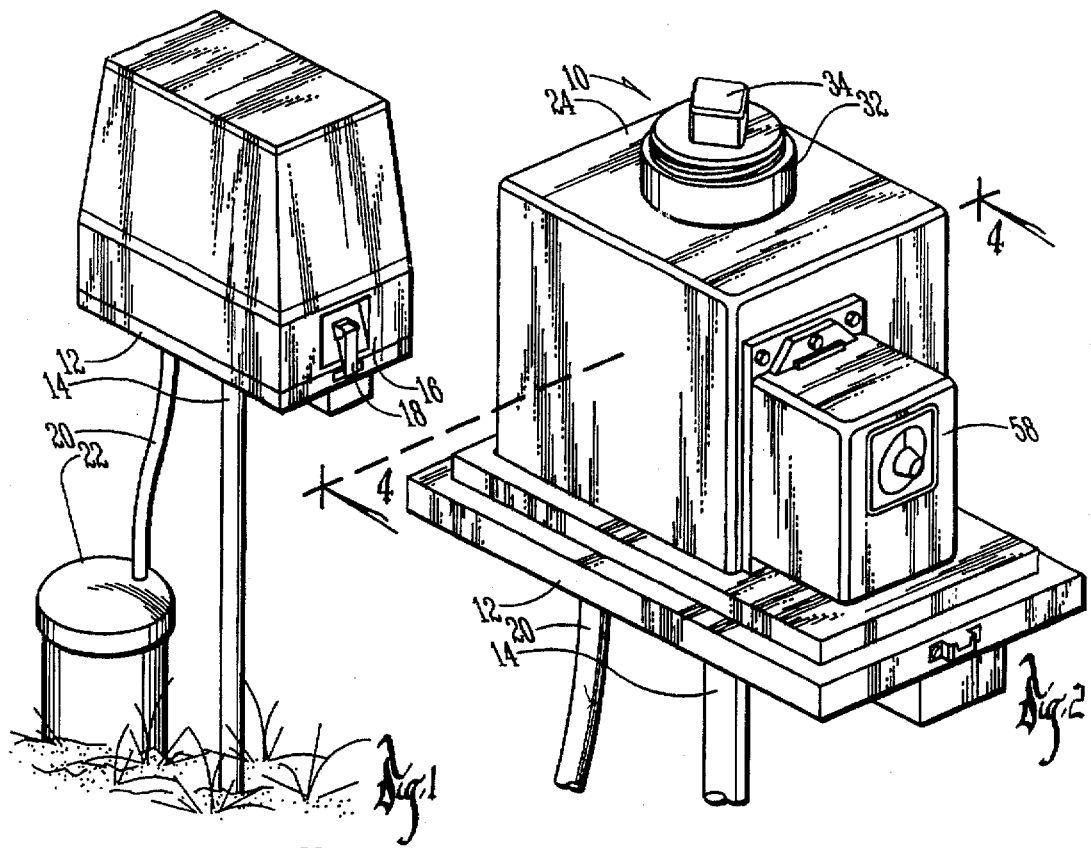
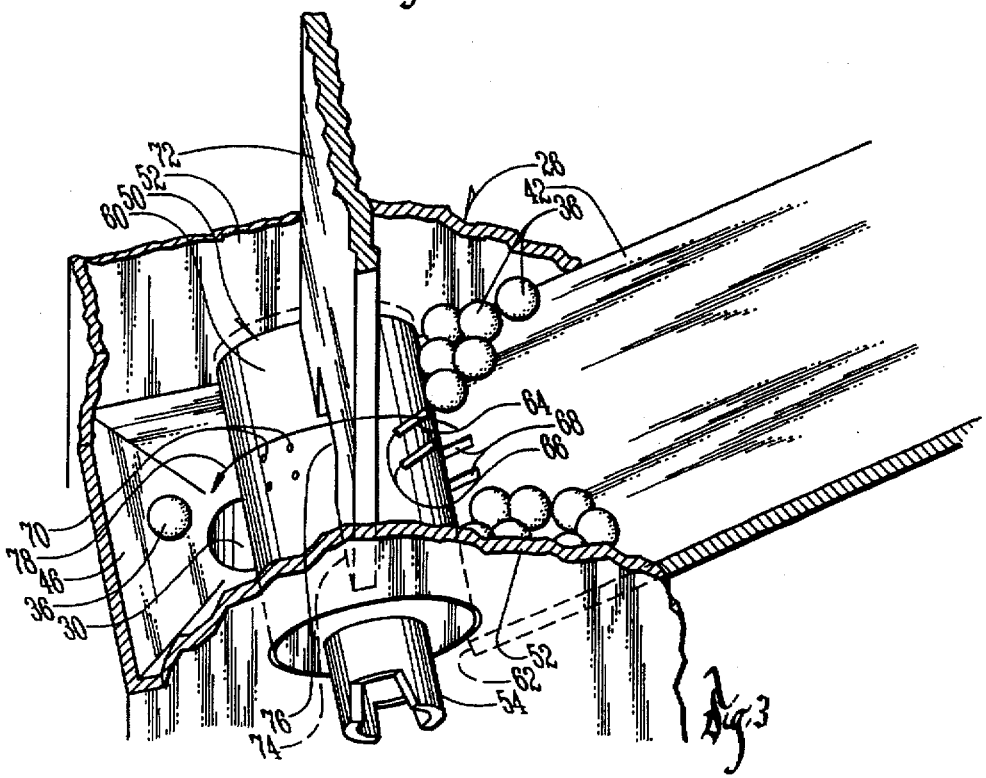

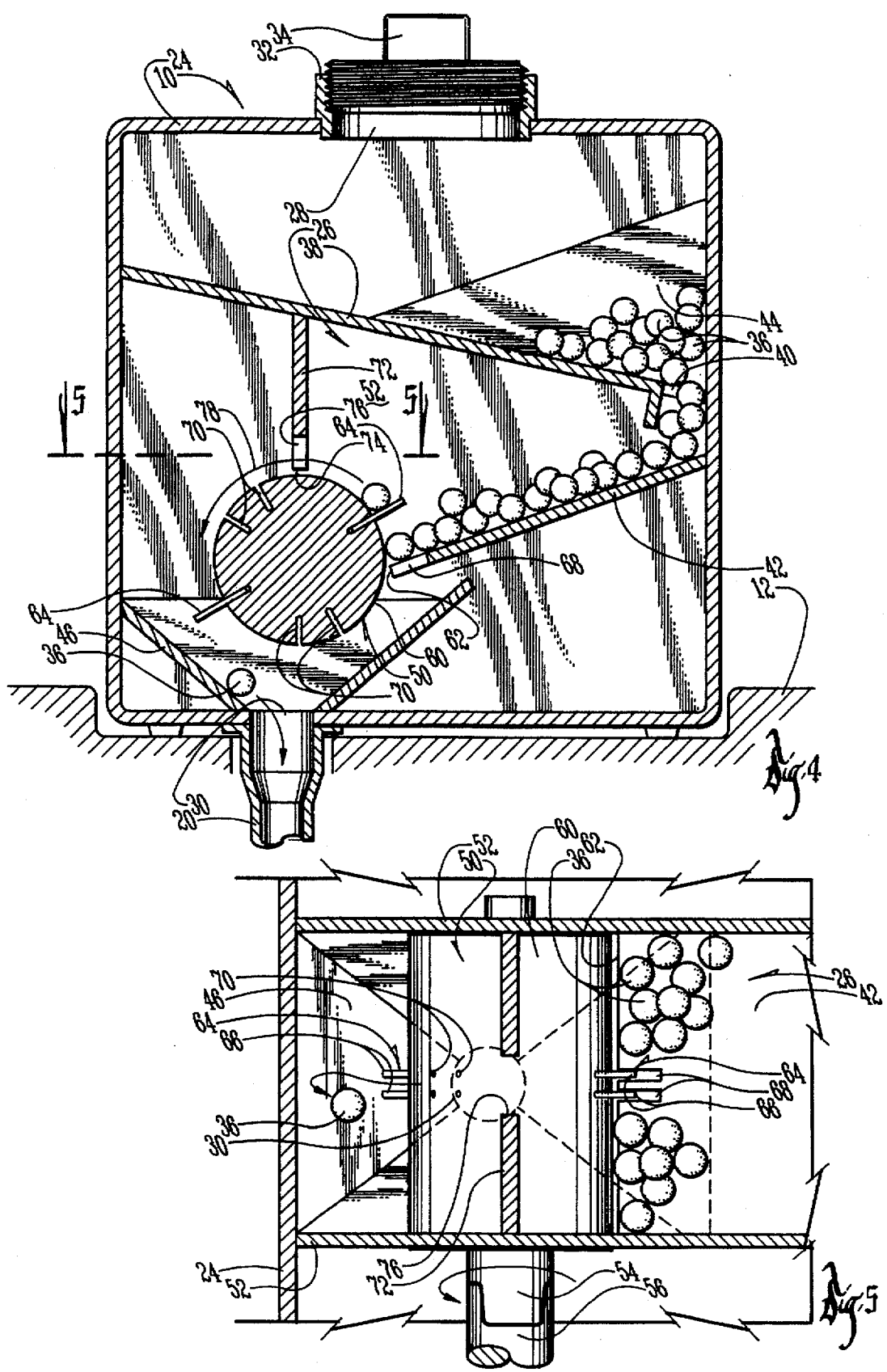

PELLET DISPENSING DEVICE

BACKGROUND OF THE INVENTION

The invention is directed to a dry pellet dispensing device and, more particularly, to a device for dispensing dry chemical pellets for the treatment of water pumped from a well.

There are thousands of homes, farms, businesses and small communities which rely on private wells as the sole source of water for both people and animals. According to surveys, nearly half of these wells contain contaminants that are aesthetically annoying or may have detrimental effects to human and animal health. Some of these problems include:

1. Bacterial contamination. There are many forms of bacteria and virus which may be found in water supplies especially if the well is under ninety feet in depth. Hepatitis, gastroenteritis and dysentery are just three illnesses that may come from water borne pathogens. Chlorine can be injected into the well to disinfect these bacteria.
2. Nuisance bacteria. There are forms of bacteria that while they do not cause disease, create problems for the homeowner. Sulfate reducing bacteria produce hydrogen sulfide, a gas that smells like rotten eggs and is corrosive to water pipes. Iron bacteria, of which there are several types, feed on iron in the water and attach to well screens, pump impellers and water lines, thereby restricting or preventing water flow. Chlorine will kill these bacteria to restore water flow and will improve the water quality.
3. Algae. If present in a well, these organisms may create a fishy or musty odor to the water making it unpalatable for drinking. Again, by adding chlorine, the algae will be killed, thus improving the taste of the water.
4. Inorganic metals. Dissolved ions of iron and manganese are difficult to remove from a water supply. When present in water, such inorganic metals cause staining on sinks, bathtubs, dishwashers, clothes and other materials which they contact. The addition of chlorine to water will enlarge the ions from the dissolved ferris state to a precipitated ferric or enlarged form. This change, which is caused by the oxygen in the chlorine, makes it much easier to filter the iron and manganese from the water.
5. Low pH. A water with a pH of under 7.0 is corrosive to metals. A pH of 6.0 is ten times as corrosive as water with a pH of 7.0. A pH of 5.0 is 100 times as corrosive as water with a pH of 7.0. PH can be raised by adding a chemical such as soda ash to any level needed by the home, farm or business owner. Other chemicals, such as flocculents or sequestering agents may be added to water if needed to improve the quality.

Devices for treating water with chemicals are known. Examples include U.S. Pat. Nos. 3,785,525, 4,235,849 and 4,676,399. These patented devices rely on rotating plates to meter the dispensing of solid pellets from a supply reservoir into the well. These known devices suffer from several problems. For example, these rotating plate devices have difficulty in metering precisely and adjustably the amount of chemical required to treat the water in the well. Also, the chemical pellets are subject to breakage and the broken pellets can jam the metering or delivery parts of these prior art devises. Furthermore, satisfactory performance of the devices depend on the reliability of the metering plates to select a single pellet on each dispensing cycle. The rotary plate devices may dispense more than one pellet or only parts of broken pellets, thus resulting in over or under treatment of the water.

Another type of dry pellet dispensing device for water treatment is disclosed in U.S. Pat. No. 4,694,900 which incorporates a revolving drum which has indentations to accept a pellet and outwardly flaring V-shaped grooves to agitate the pellets towards the pellet receiving indentation. This drum is enclosed within a tightly fitting tube with a small cutout area to receive the pellets and a small centrifugal hole in the bottom of the tube to allow the pellet to fall into the well. The principle of this revolving drum device described in the U.S. Pat. No. 4,694,900 patent is that a motor drives the revolving drum within the tube and as it revolves, several pellets enter the cutout area of the tube. As the revolving drum with the indentation approaches the pellets, the V-shaped grooves are suppose to agitate the pellets and allow just one pellet to enter the indentation. As the drum continues to rotate, the pellet rides in the indentation until the drum allows the pellet to drop by gravity into the well.

This device of the U.S. Pat. No. 4,694,900 patent also has limitations and problems. First, pellets that have broken or chipped during manufacturing, shipping or handling are present in the reserve reservoir. When one of these odd sized pellets enters the indentation, an undamaged pellet will also enter and lay on top. As the drum continues to rotate, it meets the end of the retaining tube where the previously undamaged pellet is shattered and falls back into the storage reservoir. This breakage compounds the feedage as more and more pellets become broken and shattered. Second, powder from the broken or ground up pellets builds up between the feed drum and the retaining tube until the feed drum becomes frozen and cannot turn. Third, pellets that become oversized, as most of the material to be fed is hygroscopic and can swell, will have some material shaved off of each one. This shaved off material will collect on the drum and between the drum and retaining tube until the feed drum stalls. Fourth, the winged grooves in the feed drum also create excess powder by rotating and irritating the pellets in storage. Fifth, the indentations in the feed drum used to pick up the pellets are established when the model is shipped. If another amount of indentations is needed, a new feed drum with other indentations must be ordered and installed. Sixth, once the feed drum is frozen in place by the powder, it is extremely difficult to remove for cleaning. As chlorine is the most common product being fed, acid or vinegar is normally used to dissolve the impacted powder. The fumes created from this mixture is not only obnoxious, but also dangerous to inhale. This cleaning process may take several hours before the acid or vinegar has dissolved enough powder to free and release the feed drum.

Accordingly, a primary objective of the present invention is the provision of an improved device for dispensing chemical pellets into a well.

Another objective of the present invention is the provision of an improved pellet dispensing device having spaced apart pickup pins which carry a single pellet from a pellet chamber for discharge into the well water.

A further objective of the present invention is the provision of an improved pellet dispensing device which minimizes or eliminates breakage and powdering of pellets.

Another objective of the present invention is the provision of a pellet dispensing device having a rotatable drum with a plurality of pellet pickup members equally spaced radially around the drum.

Still another objective of the present invention is the provision of a pellet dispensing device which is economical to manufacture, and which is durable, efficient and safe in use.

These and other objectives will become apparent from the following description of the invention.

SUMMARY OF THE INVENTION

The present invention is directed towards an improved device for dispensing chemical pellets into well water. The device includes a housing which defines a pellet chamber or storage area, with an inlet for introducing the pellets into the chamber and an outlet for dispensing the pellets from the chamber to the well. A metering cell or drum is rotatably mounted within the pellet chamber. Rotation of the drum is controlled by a motor mounted within the housing, with the motor being periodically actuated by a timing device electrically connected to the well pump such that each time the pump is activated, the motor is actuated to rotate the metering drum, and thereby dispense chemical pellets into the well water.

The housing includes a sloped wall within the pellet chamber which extends into close proximity with the metering drum so that pellets move by gravity along the sloped wall into engagement with the drum, without passing between the sloped wall and the drum. The drum is cylindrical, and includes at least one pellet pickup member which extends outwardly from the drum surface. Preferably, the pickup member is a pair of pins which are spaced apart a distance less than the smallest dimension of the pellets. Thus, as the drum rotates, the pins pickup and carry a single pellet from the pellet chamber for discharge through the outlet, which is in communication with the well. Additional pellet pickup members may be equally radially spaced about the drum to increase the quantity of pellets supplied to the well water.

BRIEF DESCRIPTION OF THE DRAWINGS

FIG. 1 is a perspective view of a pellet dispensing device operatively connected to a well.

FIG. 2 is a perspective view showing the pellet dispensing device with the protective cover removed.

FIG. 3 is a partial sectional view showing the improved metering drum of the device.

FIG. 4 is a sectional view taken along lines 4—4.

FIG. 5 is a partial plan sectional view taken along lines 5—5 of FIG. 4.

DETAILED DESCRIPTION OF THE PREFERRED EMBODIMENT

With reference to FIGS. 1 and 2, a pellet dispensing device is generally designated by the reference numeral 10. The device 10 is mounted upon a base 12 which is secured to a pole 14 extending above the ground. A protective cover 16 fits over the device 10 and secures to the base 12 by one or more latches 18 so as to protect the device 10 from the weather elements. A tube or conduit 20 extends from the device 10 to the water well 22.

As best seen in FIG. 4, the device 10 includes a housing 24, which defines a pellet chamber 26. The housing includes an inlet 28 and an outlet 30. The inlet 28 includes a collar 32 with a threaded plug 34 which normally closes the inlet 28, and thereby sealing the top of the chamber 26. The plug 34 can be unthreaded from the collar 32 so as to provide access to the inlet 28, and thereby allow pellets 36 to be introduced into the pellet chamber 26. The tube 20 is secured or connected to the outlet 30 so that pellets 36 can be introduced into the well 22, as described below.

A plurality of sloped walls are provided within the housing 24 for controlling the flow of the pellets 36 within the pellet chamber 26. More particularly, an upper sloped wall 38 extends from one side of the housing 24 to the opposite side of the housing. The upper wall 38 has an opening 40 adjacent one wall of the housing 24 through which the pellets 36 drop for receipt on a lower sloped wall 42. Since the walls 38 and 40 are sloped, the pellets 36 move by gravity. Additional laterally sloped walls 44 further direct the pellets 36 to the opening 40. A funnel 46 is provided in the lower portion of the housing 24 to direct the pellets 36 to the outlet 30 and into the tube 20.

The above described components of the device 10 are conventional and do not constitute a part of the present invention.

The present invention is directed towards an improved metering drum or feed cell 50. The drum 50 is cylindrical, and is rotatably mounted within the pellet chamber 26. As best seen in FIGS. 3 and 5, the drum 50 extends between a pair of side walls 52 in the lower portion of the pellet chamber 26. The drum 50 includes a coupling 54 which is connected to the drive shaft 56 of a conventional motor operatively mounted within the housing 24. The motor is actuated by a conventional adjustable percentage timer 58, which is electrically connected to the pump (not shown) of the well. Thus, each time the pump is actuated, the motor is actuated for a set period of time to rotate the metering drum 50.

As best seen in FIGS. 4 and 5, the metering drum or feed cell 50 includes an outer peripheral surface 60 which is in close proximity to the terminal edge 62 of the lower sloped wall 42. The space between the edge 62 of the lower sloped wall 42 and the peripheral surface 60 of the drum 50 is sufficiently small to prevent the pellets 36 from passing therebetween. Preferably, the edge 62 of the lower wall 42 is at an elevation no higher than the horizontal center line of the drum 50.

One or more pellet pickup members 64 extend outwardly from the surface 60 of the drum 50. More particularly, each pickup member 64 includes a pair of spaced apart fingers or pins 66 which extend substantially radially outwardly from the drum 50. The pins 66 are spaced apart a distance less than the smallest dimension of the pellets 66, but are sufficiently spaced apart so as to pickup or cradle a single pellet when the drum 50 is rotated. A pair of slots 68 are located in the lower sloped wall 42 adjacent the terminal edge 62 thereof. The slots 68 allow the pins 66 to pass therethrough during rotation of the drum 50.

Preferably, the drum 50 includes two pair of opposite pickup members 64 positioned 180° apart on opposite sides of the drum. The drum 50 may include additional holes 70 for receiving additional pins 66 at equally spaced radial locations along the surface 60 of the drum 50. Thus, three or four sets of pickup members may be provided on the drum to increase the quantity of pellets dispensed into the well during each revolution of the drum 50.

A substantially vertically oriented wall 72 extends downwardly from the upper sloped wall 38. The vertical wall 72 includes a lower terminal edge 74 spaced closely to the surface 60 of the drum 50. A slot or opening 76 is provided in the vertical wall 72 adjacent the terminal edge 74 to allow a pellet 36 carried by the pickup members 64 to pass through the wall 72. The slot 76 is sufficiently narrow to prevent more than one pellet from passing therethrough at a time. Thus, even if a pile of pellets accumulates in the lower portion of the pellet chamber 26 adjacent the drum 50, only a single pellet will be carried by the pins 66 through the slot 76 in the vertical wall 72.

In operation, the device 10 is loaded with pellets 36 by removing the plug 34 and pouring the pellets through the collar 32. The pellets 36 accumulate in the pellet chamber, and move by gravity downwardly along the sloped walls 38, 42. Thus, as seen in FIGS. 4 and 5, a plurality of pellets 36 will accumulate adjacent the surface 60 of the drum 50. The laterally sloped walls 44 further direct the pellets 36 toward the lateral center of the drum 50. When the well pump is activated, an electrical current is sent to the timer 58, which actuates the motor for a selected time period, thereby rotating the drum 50 for a period of time. As the drum 50 rotates, each set of pins 66 picks up and carries a single pellet 36 upwardly and through the slot 76 in the vertical wall 72, as indicated by the arrow 78 in FIGS. 3 and 4. As the pellet 36 moves over the vertical center line of the drum 50, the pellet drops into the funnel 46 and passes through the outlet 30 of the housing 24 and into the tube 20, which directs the pellet to the well 22.

The adjustable percentage timer 58 is set so as to actuate the motor for a desired time period each time the well pump is actuated. For example, the timer 58 is preferably on a 30 second repeat cycle. Thus, as electrical current is fed to the timer 58 from the pump, the motor is actuated for a set percentage of the 30 second cycle. Thus, a 25% setting will energize the motor to run for 7½ seconds and shut off for 22½ seconds during the 30 second cycle, while a 50% setting will energize the motor for 15 seconds and shut it off for 15 seconds during the 30 second cycle. A setting of 100% will allow the motor to run continuously as long as energy is provided to the timer 58. Accordingly, with a 1 RPM motor set at 100% of pump running time, two pellets 36 per minute will be dropped into the well 22, while a setting of 50% will yield one pellet per minute being dropping into the well, when the drum 50 has two pickup members 64 extending therefrom.

It is noted that the pellet chamber 26 is substantially free of obstruction around the metering drum 50. Thus, pellet breakage is minimized or eliminated, and there is no area to allow powder to collect or buildup, thereby preventing any jamming or freezing of the drum 50.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. An improved device for dispensing chemical pellets into a well, the device including a housing defining a pellet chamber, a motor operatively connected to a well pump, and a tube providing communication between the housing and the well, the improvement comprising:

a feed cell rotatably mounted within the housing and being rotatable by the motor, the cell having an outer surface;

a first pellet pickup member extending outwardly from the surface of the cell so as to carry a pellet during rotation of the cell and deposit the pellet in the tube for entry into the well.

2. The improved device of claim 1 wherein the cell is a cylindrical drum, and the first pellet pickup member is a pair of pins extending substantially radially outwardly from the drum.

3. The improved device of claim 2 wherein the pins are spaced apart a distance less than the smallest dimension of the pellets.

4. The improved device of claim 1 further comprising a second pellet pickup member spaced approximately 180° from the first pellet pickup member.

* * * * *